H. BAKER.
Hay Raker and Loader.
No. 55,979. Patented July 3, 1866.
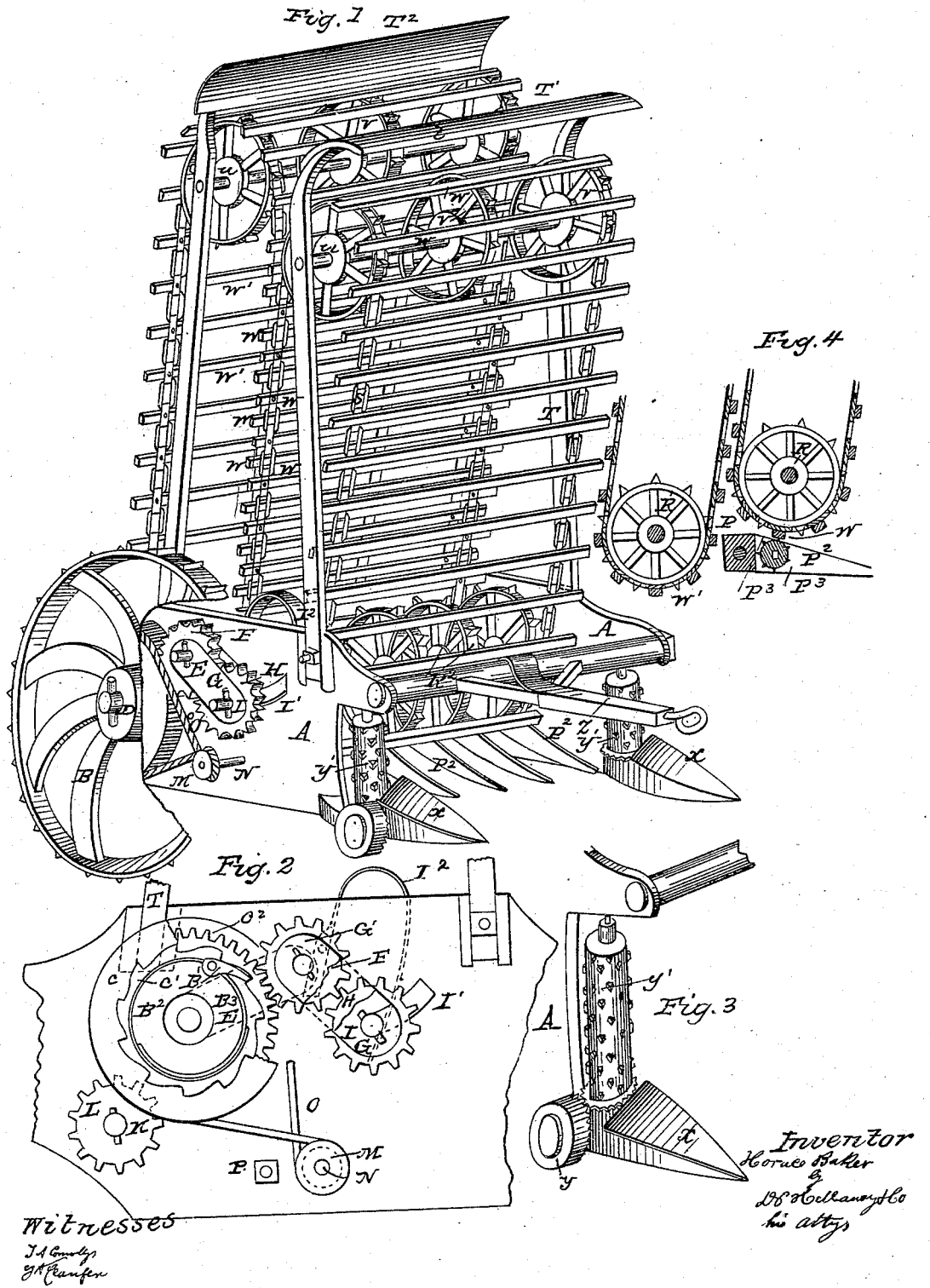

UNITED STATES PATENT OFFICE.

HORACE BAKER, OF CORTLAND, NEW YORK.

IMPROVEMENT IN HAY RAKERS AND LOADERS.

Specification forming part of Letters Patent No. 55,979, dated July 3, 1866.

*To all whom it may concern:*

Be it known that I, HORACE BAKER, of Cortland, in the county of Cortland and State of New York, have invented a new and useful Machine for Loading Hay; and I do hereby declare that the following is a full, clear, and exact description of the same, reference being had to the annexed drawings, made part of this specification, in which—

Figure 1 is a perspective view. Fig. 2 is a side elevation, showing the box and gearing. Fig. 3 is a detached view of the front roller. Fig. 4 is a section, showing the relation of the horizontal roller and fingers.

The same letters refer to identical parts.

My invention relates to a machine for gathering the cut grass from the ground and loading it onto a wagon.

The machine is hitched to the hind axle of a wagon and rides close to the end of the hay-rack, upon which the hay falls as it is raised by the loader.

The construction of the apparatus will appear from the following description: A A are the sides of the main frame, to which the machinery is attached; B, the driving-wheels, are attached to fixed axles projecting from and secured to the sides A. On the inner face of the hub of the wheels is a flange, (represented as in section in Fig. 2 and marked $B^2$.) The rest of the wheel is not shown in this figure, with the exception of the pawl B', which is pivoted to the hub of the wheel and pressed outward by the coiled spring $B^3$, attached to the flange $B^2$. On the axle D also revolves the cup-formed wheel C, which has an internal ratchet cut on the inner face of its externally-projecting flange in such manner that the pawl shall press against and carry this wheel with it when the driving-wheel B is turning forward; but when the driving-wheel is turning backward, the pawl slipping over the inclined faces of the ratchet, the wheel C will not move.

The flange C' is finished on the exterior face nearest the rim as a pulley to receive the belt O, and on the opposite side, on the portion forming the hub or solid part of the wheel, is placed the spur-gearing $C^2$. Between the wheel C and the side A there is also attached to the axle D straps E, which turn on the axle freely, and have a wrist-pin, E', projecting from the other end, parallel with the main axle D, and sustaining the spur-wheel F, meshing into the spur $C^2$ on one side and on the other into the twin spur-wheel H, which revolves upon the projecting end of the shaft I. This shaft is attached to the wrist E' by straps G on each side of the twin spur-wheels. The straps G fit loosely upon their respective bearings.

The shaft I passes through a slot I' in the sides A, and the straps G and E allow a free play to the shaft I without deranging the gearing, for purposes that will be hereinafter explained.

Opposite the spur F the spur-wheel K is also geared into the spur-wheel $C^2$, communicating motion to the shaft L. The spur-wheels F, H, and K are all of the same size and have the same number of revolutions in a given time.

Below the twin spur-wheels F and H is the pulley M, attached to the shaft N. This pulley receives motion from the wheel C by means of the crossed belt O.

The two sides of the machine are finished in the same manner.

Across the machine, connecting the sides, is the rake-head P', secured by a rod, P, and to the rake-head are attached the rake-teeth $P^2$, which project forward, and are so arranged that their points shall pass below the cut grass. The rake head and teeth I propose to make of wood.

The shaft N passes through the base of the rake-teeth. It is made round where it passes through the teeth, and square between them. These square portions carry a series of rollers, $P^3$, running between the teeth $P^2$. The rollers have spiked projections on their faces, so as to seize the hay and carry it over the base of the teeth, and thus prevent its tangling and choking the machine. The shafts I and L in like manner pass through the sides, the shaft I having a play forward and backward by means of the slot I', as described, and being pressed backward by the bow-spring $I^2$. On each end of these shafts I and L are pulleys R R', having pyramidal projections from the rims working into the open links of the four endless chains S and S'.

Intermediate wheels, $R^2$, may be used if thought best for supporting the bars of elevators.

T T are four wooden standards, made as small as is consistent with the required strength, so as to afford them the necessary elasticity required for keeping the aprons face to face and at the same time to permit variations in the quantity of grass carried between them. They are attached by bolts to the sides A, and stayed by lugs cast on the sides, as shown in the drawings. They are bent at their upper ends, and receive the two curved guide-boards T' and $T^2$ for directing the hay onto the wagon.

Across the standards, immediately below their curved extremities, are attached the counter-shafts U and U', journaled upon the front and rear standards respectively. On these shafts are pulleys V and V', corresponding to the pulleys R and R'. The endless chains S and S' pass over these pulleys also, the chains S passing over the pulleys R and V and the chains S' over the pulleys R' and V'. Pyramidal projections are placed on the faces of the pulleys V and V', for the same purpose as on the pulleys R and R'. Bars W, of wood, are attached to the endless chains respectively, forming an elastic endless apron.

The projecting shoes X extend from the lower front end of the sides A, for dividing the cut grass, throwing inwardly that which is intended to be raised. At the base of the shoe is the wheel Y, running upon the ground, and having gearing-teeth upon its inner edge, communicating a revolution inwardly to the vertical roller Y', which has the same rough projections as the horizontal rollers between the rake-teeth. The purpose of this roller is to direct the hay that may ride over the shoe into the machine and not allow it to gather in front and impede the operation of the machine.

In operating this machine, it is attached by the short tongue Z to the hind axle of the wagon. The fork-teeth $P^2$ running under the hay, it is carried by the rough rollers $P^3$ onto the rake-head. The endless aprons work close to this rake-head on each side, and they seize the hay, and as they revolve in opposite directions and close together, the hay is carried upward between them. The slot I', allowing the shaft I to advance at the same time that it is compressed by the tension of the spring $I^2$, any quantity that may be found will pass between the aprons and be elevated until, striking against the lower side of the guide $T^2$, it will be directed forward over the upper surface of the guide T' and fall upon the hay-rack upon the wagon.

What I claim as my invention, and seek to secure by Letters Patent, is—

1. The rake-teeth $P^2$, in combination with two positively-actuated endless aprons W and W', revolving in opposite directions, and so placed in relation to each other that the cut grass raised over the teeth shall be seized between the aprons and elevated, substantially in the manner set forth.

2. The standards T T, when so constructed that by their elasticity they shall maintain the aprons W W' face to face and permit variations in the quantity of grass carried between them, substantially as set forth.

3. In combination with the endless aprons W and W', the guides $T^2$ and T', when attached to the standards T T, and so constructed as to carry the cut grass over and beyond the endless aprons, substantially as set forth.

4. The driving-wheel B and cup-shaped wheel C, constructed as described, in combination with the spur-wheels G, H, and K, substantially as and for the purpose set forth.

5. The shoe X, in combination with the wheel Y and roller X', arranged substantially as and for the purpose set forth.

6. The combination of the teeth $P^2$, shaft N, and rollers $P^3$, substantially as and for the purpose set forth.

In testimony whereof I have signed my name to this specification in the presence of two subscribing witnesses.

HORACE BAKER.

Witnesses:
JOHN S. HOLLINGSHEAD,
JOHN D. BLOOR.